Figure 2:
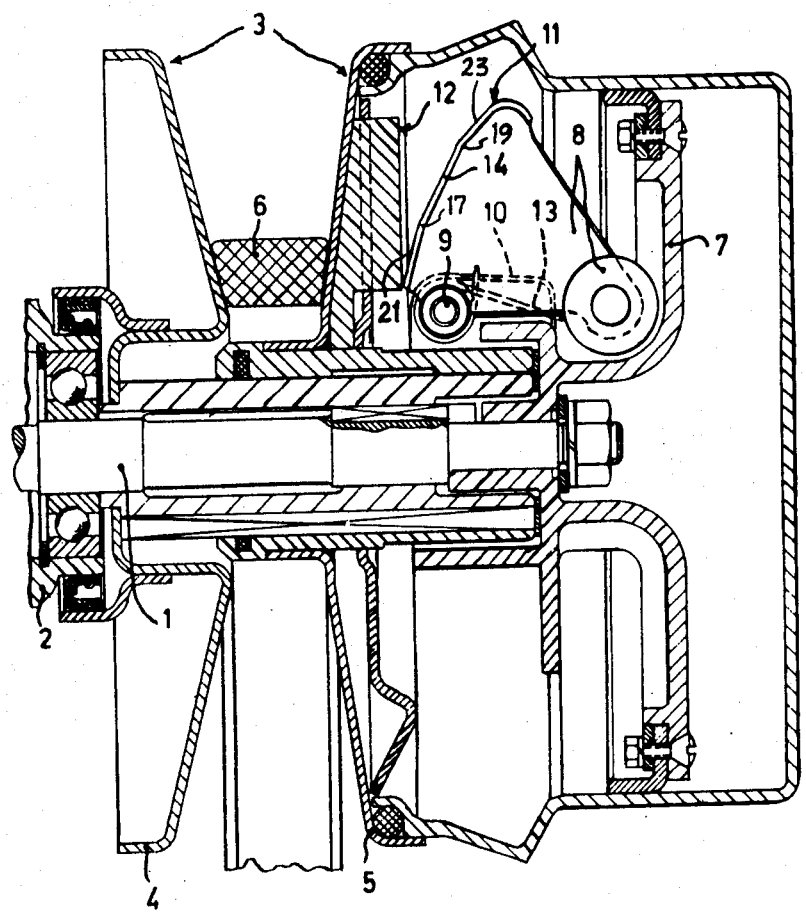

United States Patent [19]

Boer et al.

[11] 4,284,408

[45] Aug. 18, 1981

[54] AUTOMATIC VARIABLE POWER TRANSMISSION

[75] Inventors: Edo Boer, Eersel; Sybrand W. Vogt, Mierlo, both of Netherlands

[73] Assignee: Volvo Car B.V., Mc Helmond, Netherlands

[21] Appl. No.: 73,674

[22] Filed: Sep. 10, 1979

[30] Foreign Application Priority Data

Sep. 8, 1978 [NL] Netherlands .................. 7809168

[51] Int. Cl.³ ............................................ F16H 11/06
[52] U.S. Cl. .................................. 474/14; 192/105 C
[58] Field of Search ..................... 74/230.17 E, 868; 192/70.3, 105 C, 103 A; 474/12, 13, 14, 15, 38, 46

[56] References Cited

U.S. PATENT DOCUMENTS

| | | | |
|---|---|---|---|
| 2,195,354 | 3/1940 | Bateman | 192/105 C |
| 2,216,771 | 10/1940 | Evans | 192/105 C |
| 3,017,783 | 1/1962 | Van Der Brugghen et al. | 74/230.17 E |
| 3,362,242 | 1/1968 | Watkins | 74/230.17 E |
| 3,685,366 | 8/1972 | Schupan | 74/230.17 E |
| 3,698,256 | 10/1972 | Albertson | 474/14 X |
| 4,206,659 | 6/1980 | Rijsdijk | 474/14 |

FOREIGN PATENT DOCUMENTS 7601287 8/1977 Netherlands .

*Primary Examiner*—C. J. Husar
*Assistant Examiner*—Moshe I. Cohen
*Attorney, Agent, or Firm*—Price, Heneveld, Huizenga & Cooper

[57] ABSTRACT

In known V-belt automatic variable power transmissions the change in the gear ratio as a function of angular velocity or the number of revolutions at full throttle at high loads is a compromise between the desired performance of the vehicle and fuel consumption, emission, noise nuisance considerations. The invention obolishes this compromise by making the gear ratio constant in a determined region or range of angular velocities around the original change gear ratio and number of revolutions relationship. In a preferred embodiment this is achieved by the shape of the cam surfaces of the centrifugal weights which surfaces are almost straight over a determined portion thereof.

2 Claims, 2 Drawing Figures

AUTOMATIC VARIABLE POWER TRANSMISSION

The invention relates to an automatic variable power transmission having a V-belt for driving a vehicle. The transmission includes adjustable pulleys each at least having one axially displaceable pulley half. An adjustment device for the pulleys is provided so that the adjustment is also dependent upon the number of revolutions or angular velocity of the drive shaft.

Such an automatic variable power transmission is known from Dutch patent specifications Nos. 95 773 and 76 01287.

For such an automatic power transmission one has a change gear angular velocity number of revolutions which lies between a minimum and maximum gear ratio the change gear angular velocity corresponds to a low number of revolutions at low loads and to a higher number of revolutions at full gas or throttle at high loads. In the latter case the problem occurs that a compromise should be found between on the one hand the performance of the vehicle, for which a high number of revolutions should be selected, and on the other hand the fuel consumption, the emission and noise nuisance requiring a somewhat lower number of revolutions.

It is the object of the invention to solve this problem, in that for the change gear angular velocity or number of revolutions at full gas or throttle not one number of revolutions is selected, but a number of revolutions which are dependent upon the vehicle speed. In principle a so-called full gas or throttle line is obtained which could be imagined to be built from three portions, namely:

a portion for low speeds, up to about 70 km/h, where the change gear angular velocity or number of revolutions is selected to be relatively low, i.e. between about 3500 and 4000 revolutions per minute, a portion or range of vehicle speed or angular velocity of the drive shaft where the gear ratio remains more or less the same, and a last portion for higher speeds, where the change gear angular velocity or number of revolutions of the engine drive shaft is selected to be much higher, i.e. between about 4500 and 5500 revolutions per minute.

At low speeds, for instance while driving through town, the number of revolutions of the engine or angular velocity of the drive shaft becomes low, with the result that a favourable fuel consumption and a good comfort of noise is obtained, whereas while driving at higher speeds on highways a high number of revolutions or engine speed is allowed.

According to the invention the above-mentioned problem is solved, in that the gear ratio between the pulleys remains almost constant in a selected portion of the region of the number of revolutions or engine speed.

For an adjustment device acting with centrifugal weights which are swingable in radial planes, the most obvious embodiment is that in which the gear ratio which is almost constant in a determined portion of the region of the number of revolutions, is obtained by the shape of the cam surface of the centrifugal weights. The shape of the cam surface can for instance be almost straight over a determined portion, contrary to the known shapes showing a smoothly curved line.

In a hydraulically controlled belt transmission for instance the desired constant gear ratio in a determined portion of the region of the number of revolutions can be effected by a control valve in the hydraulic system.

Figure 1:
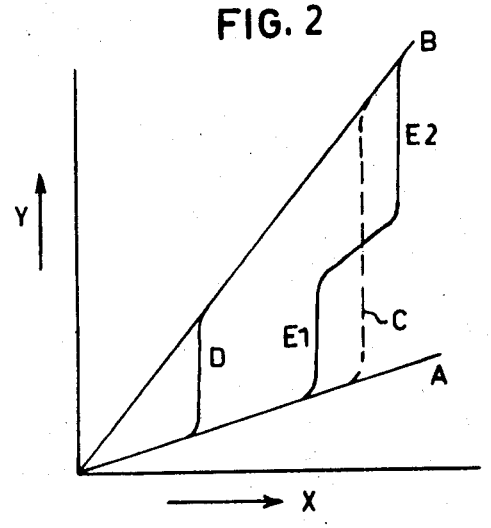

FIG. 1 is a graph showing the relationship of angular velocity of the drive shaft or engine speed to vehicle speed; and FIG. 2 is a cross-sectional view of a variable ratio power transmission in accordance with the present invention.

In FIG. 1, the less inclining line A represents the relationship between the number of revolutions or speed X of the engine indicated on the horizontal axis and the speed Y of the vehicle indicated on the vertical axis. Line B which is sharper inclined represents this relationship when the number of revolutions of the engine is decreased, i.e., when the gear ratio is increased. The dotted vertical line C schematically indicates the present procedure during gearing or change in gear ratio. Where the number of revolutions is decreased during deceleration, the transfer from line B to line A or "downshifting" takes place along line D.

The discovery of the invention now is that it offers advantages to replace the dotted vertical line C by a line comprising two portions E1 and E2 respectively. The transmission, therefore, has a low gear range, an intermediate range, and a high range.

One could imagine achieve the desired curve by fastening or preventing movement of the displaceable pulley half of a variable ratio transmission in the relative region or desired range of the number of revolutions or engine speed. A simpler solution to preventing movement by fastening or fixing the pulley half is achieved by the present invention.

The solution is indicated in FIG. 2.

The transmission shown in FIG. 2 includes a drive or driven shaft 1 supported within a housing 2.

On the driving shaft 1, a primary pulley 3 has been arranged. This pulley comprises a pulley half 4 fixedly connected to the driving shaft and a pulley half 5, which is movable or shiftable with respect to the shaft 1 in an axial direction but is connected thereto in the direction of rotation and hence rotates with shaft. In the drawing the pulley 3 has been indicated in the most expanded position, in which the V-belt 6 which is located in the pulley extends on a small effective diameter. The transmission is in its lowest gear ratio.

To the shaft 1 a disc-shaped piston 7 has been secured which is provided with a hub carrying for instance three centrifugal weights 8, of which only one is shown. The centrifugal weights are swingable or pivotable in a radial plane around a shaft 9 which is secured in a projecting portion 10 of the hub of the piston 7. Each weight 8 includes a section 9 defining a cam surface 11. The cam surface 11 of the sector is in contact with a radial plane or cam follower face 12 at the outer side of the pulley half 5. A light wire spring 13 keeps or biases the cam surface 11 into contact with the plane 12 when the shaft 1 does not rotate and the weights 8 are not driven outwards by the centrifugal force.

It should be clear that when the shaft 1 rotates, the centrifugal weights 8 are swung outwardly, while rotating about their shafts 9 and the cam surface 11 is moving along the plane 12, by which the pulley half 5 is displaced in the direction of the pulley half 4. Cam surface 11 also includes additional portions 21, 23 separated from portion 14 by pivot points 17 and 19. Straight portion 14 moves into full contact with follower 12 at a predetermined engine speed. This is represented by line $E_1$ in FIG. 1 and the gear ratio has shifted to a value intermediate that represented by lines A and B. The flat portion 14 increases the effective moment arm of the reactive force countering the rotation of weights 8 due to centrifugal force. The engine speed must increase to a higher value, as shown in FIG. 1, before such is overcome and the weight pivots about point 19. This is represented by line $E_2$ in FIG. 1.

The special effect of the cam surface 11 is, that contrary to the curved shape in the known embodiments, this cam surface 11 comprises a straight surface portion 14 the location of which is responsible for keeping the gear ratio constant in a determined region of the number of revolutions.

Other embodiments than indicated in the drawing are also included in the scope of the claims.

What is claimed is:

1. An automatic variable power transmission of the type having a V-belt and adapted for driving a vehicle, said transmission comprising:

a drive shaft;

an axially adjustable pulley means for receiving a V-belt, said pulley means including a fixed pulley half secured to said drive shaft and a movable pulley half slidably secured to said drive shaft for movement towards and away from said fixed pulley half to thereby vary the gear ratio of the transmission; and automatic adjustment means operatively engaging said movable pulley half for shifting said movable pulley half towards said fixed half as the angular velocity of the drive shaft increases and for maintaining the gear ratio of the transmission relatively constant within a predetermined range of drive shaft angular velocities, said adjustment means comprising:

at least one centrifugal weight member; and means for pivotally securing said weight member to said shaft for radial displacement upon rotation of said drive shaft, said weight member defining a cam surface in contact with a straight cam follower surface carried by said movable pulley half, said cam surface including an elongated, generally straight portion whereby when said straight portion engages said cam follower surface at a first angular velocity, the weight member will not pivot and the gear ratio will remain essentially constant until a second higher angular velocity of said drive shaft is reached.

2. An automatic variable power transmission as defined by claim 1 wherein said cam surface further defines additional cam portions on each side of said generally straight portion, said portions being separated from each other by pivot points.

* * * * *

UNITED STATES PATENT AND TRADEMARK OFFICE
CERTIFICATE OF CORRECTION

PATENT NO. : 4 284 408
DATED : August 18, 1981
INVENTOR(S) : Edo Boer and Sybrand Willem Vogt It is certified that error appears in the above—identified patent and that said Letters Patent is hereby corrected as shown below:

In the Abstract, line 6:
"obolishes" should be --abolishes--

Column 1, line 16:
Cancel "number of revolutions"

Column 1, line 50:
"favourable" should be --favorable--

Column 2, line 26:
"achieve" should be --achieving--

Column 2, line 28:
After "transmission" add --in some--
Cancel "in the relative"

Column 2, line 41:
After "shaft" add --1--

Signed and Sealed this

Twenty-sixth Day of January 1982

[SEAL]

Attest:

GERALD J. MOSSINGHOFF

Attesting Officer    Commissioner of Patents and Trademarks